(12) United States Patent
Jacobsen

(10) Patent No.: US 6,975,583 B2
(45) Date of Patent: Dec. 13, 2005

(54) TECHNIQUE FOR CONTINUOUS OFDM MODULATION

(75) Inventor: Eric A. Jacobsen, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 897 days.

(21) Appl. No.: 09/855,132

(22) Filed: May 14, 2001

(65) Prior Publication Data

US 2002/0167894 A1 Nov. 14, 2002

(51) Int. Cl.[7] .............................................. H04J 11/00
(52) U.S. Cl. ...................................... 370/206; 370/210
(58) Field of Search ................................ 370/203, 204, 370/206, 207, 208, 210

(56) References Cited

U.S. PATENT DOCUMENTS

| | | | |
|---|---|---|---|
| 4,881,241 A | | 11/1989 | Pommier et al. |
| 5,488,632 A | * | 1/1996 | Mason et al. ................ 375/260 |
| 5,726,978 A | * | 3/1998 | Frodigh et al. .............. 370/252 |
| 5,956,642 A | * | 9/1999 | Larsson et al. .............. 455/449 |
| 6,175,550 B1 | * | 1/2001 | van Nee ...................... 370/206 |
| 6,282,185 B1 | * | 8/2001 | Hakkinen et al. ............ 370/342 |
| 6,366,554 B1 | * | 4/2002 | Isaksson et al. ............. 370/206 |
| 6,456,653 B1 | * | 9/2002 | Sayeed ........................ 375/227 |
| 6,535,501 B1 | * | 3/2003 | Böhnke ....................... 370/345 |
| 6,545,997 B1 | * | 4/2003 | Böhnke et al. .............. 370/347 |
| 6,567,383 B1 | * | 5/2003 | Böhnke ....................... 370/280 |

FOREIGN PATENT DOCUMENTS

EP   0 872 985 A2   10/1998

OTHER PUBLICATIONS

Bingham, ADSL, VDSL and Multicarrier Modulation, 2000, John Wiley & Sons, Inc. USA, pp. 111-114.

* cited by examiner

*Primary Examiner*—Hassan Kizou
*Assistant Examiner*—Dimitry Levitan
(74) *Attorney, Agent, or Firm*—Trop, Pruner & Hu, P.C.

(57) ABSTRACT

A technique includes basing a discrete frequency transformation on the number of subcarriers in a predetermined set of subcarriers. One or more subcarriers of the set are assigned to modulate data, and the remaining subcarriers of the set are not assigned to modulate the data. The discrete frequency transformation is performed on the data to modulate the data, and mathematical operations that are associated with the subcarriers not assigned to modulate the data are excluded from the transformation.

27 Claims, 8 Drawing Sheets

| TOTAL NO. OF SUBCARRIERS (N) | PROCESSING REQUIRED FOR FFT Nlog2(N) | EQUIVALENT SUBCARRIERS USING DFT |
|---|---|---|
| 16 | 64 | 4 |
| 32 | 160 | 5 |
| 64 | 384 | 6 |
| 128 | 896 | 7 |
| 256 | 2048 | 8 |
| 512 | 4608 | 9 |
| 1024 | 10240 | 10 |
| 2048 | 22530 | 11 |
| 4096 | 49150 | 12 |
FIG. 6
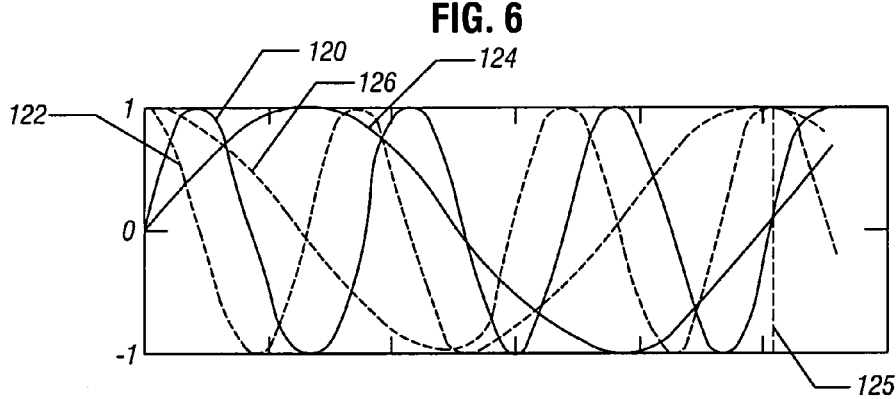
FIG. 7
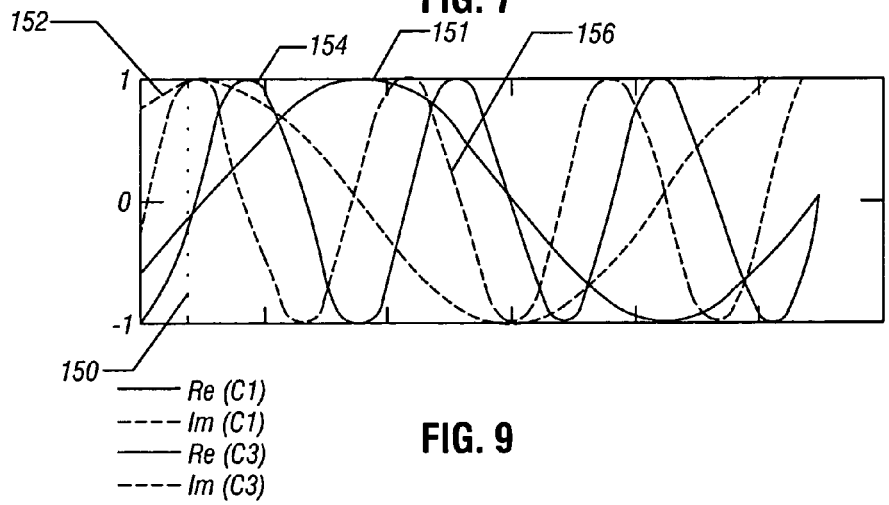
— Re (C1)
---- Im (C1)
— Re (C3)
---- Im (C3)
FIG. 9

TECHNIQUE FOR CONTINUOUS OFDM MODULATION

BACKGROUND

The invention generally relates to a technique for continuous modulation of Orthogonal Frequency Division Multiplexing (OFDM) signals.

Many recent implementations of digital wireless communication systems (wireless or cable-based systems, for example) use Orthogonal Frequency Division Multiplexing (OFDM) for environments where there is strong interference or multipath reflections. However, one disadvantage of using OFDM is the use of a Fast Fourier Transform (FFT) and an inverse FFT (IFFT) in the demodulator (for an OFDM transmitter) and modulator (for an OFDM receiver), respectively. In this manner, as described below, the calculation of the FFT and inverse FFT may add a considerable amount of complexity to OFDM transmitter/receiver due to the large processing block that is required on each end of the communication link.

For purposes of maximizing statistical multiplexing gain, many communication systems assign subsets of OFDM subcarriers to individual users, terminals or electrical devices in both the upstream and downstream directions. In this manner, the data associated with a particular user, terminal or electrical device is modulated via the associated subset of OFDM subcarriers. The resultant OFDM modulated signal is then modulated via an RF carrier signal, and the resultant signal is transmitted over a wireless link. This OFDMA modulation technique is commonly called OFDMA for Orthogonal Frequency Division Multiple Access.

The IFFT is an N point operation, i.e., the IFFT is based on a set of N subcarriers. In this manner, for the OFDM transmitter, the data that is assigned to a particular subset of these subcarriers forms an IFFT input data vector that is processed via the IFFT to produce a digital signal. This signal represents the modulation of the data with the subset of subcarriers. The IFFT involves numerous mathematical operations (accumulate and multiply operations, for example) and requires an input data vector of N coefficients.

It is possible that some of the OFDM subcarriers may not be assigned to a particular transmitter. As a result, the block computation of the IFFT for OFDM modulation may involve using zeros for the N coefficients (of the IFFT input data vector) that are associated with the unassigned subcarriers. As a result of the use of these zero value coefficients, many zero result mathematical operations in the IFFT are performed, thereby resulting in inefficient computation of the IFFT.

Thus, there is a continuing need for an arrangement or technique to address one or more of the problems that are stated above.

BRIEF DESCRIPTION OF THE DRAWING

FIG. 6 is a table depicting a comparison of the modulation technique of the present invention and a modulation technique of the prior art.

FIGS. 7 and 9 are waveforms depicting real and imaginary components of OFDM subcarriers according to an embodiment of the invention.

DETAILED DESCRIPTION

Figure 1:
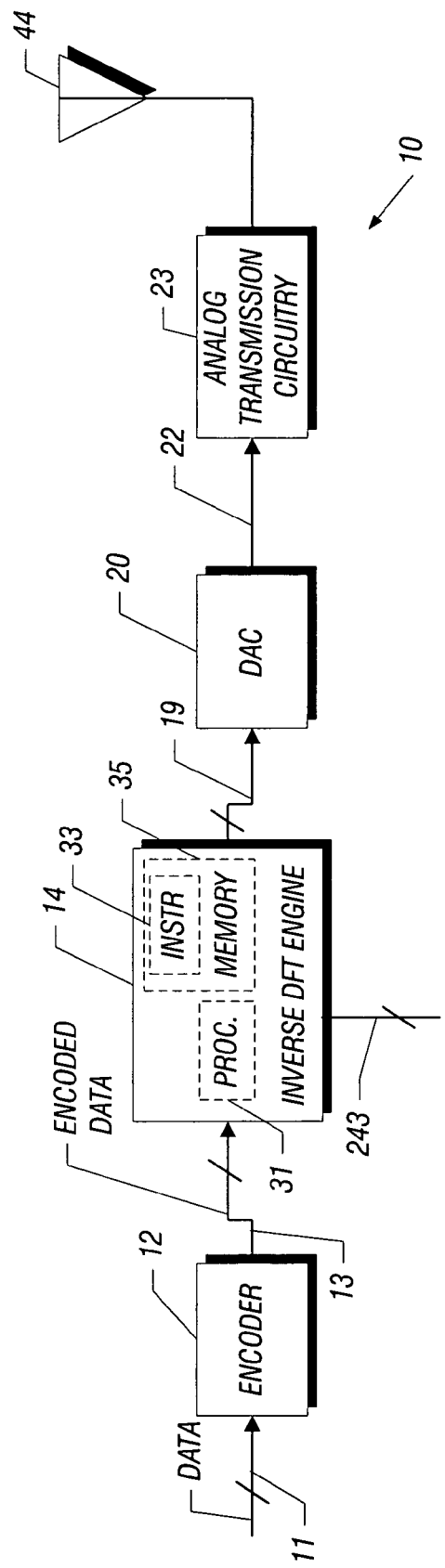
FIG. 1 is a schematic diagram of an OFDMA transmitter according to an embodiment of the invention.
Figure 11:
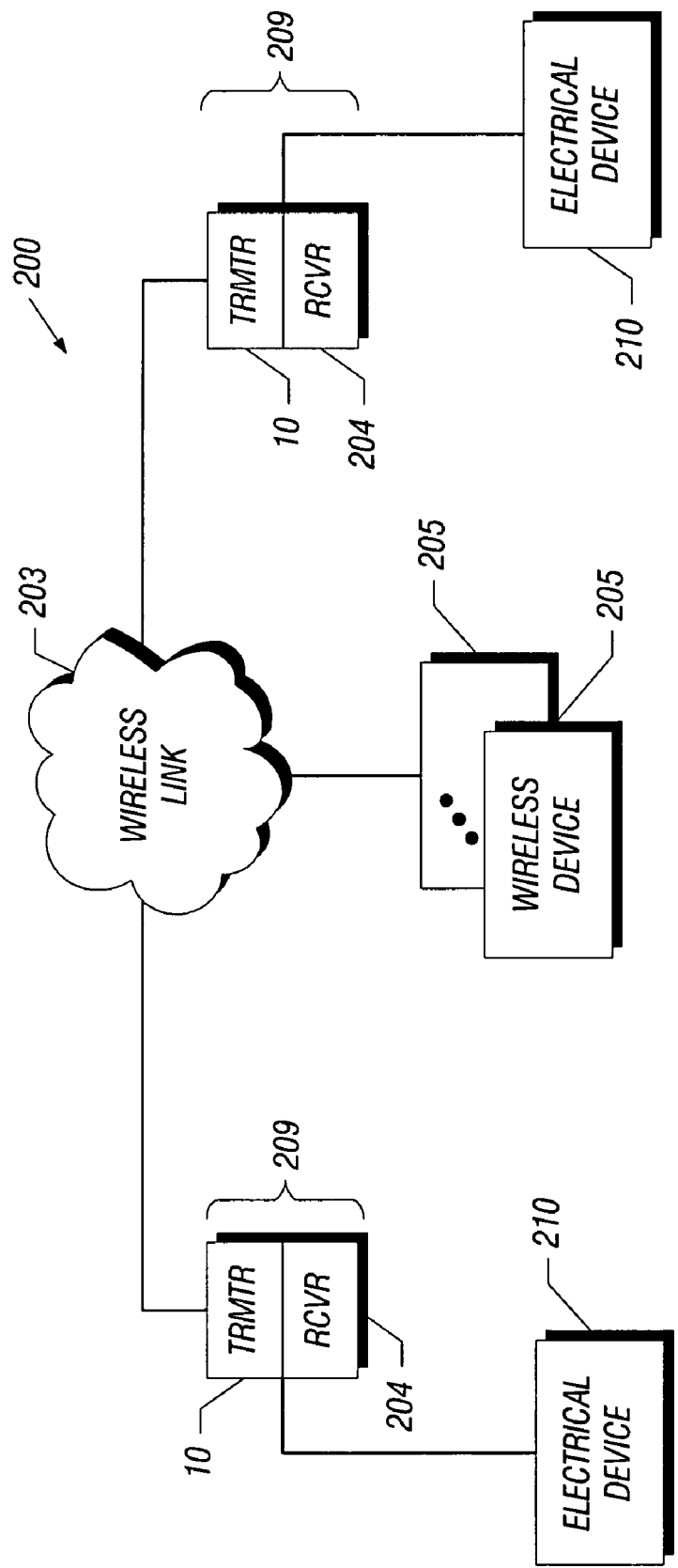
FIG. 11 is a schematic diagram of a wireless communication system according to an embodiment of the invention.

Referring to FIG. 1, an embodiment 10 of an OFDMA transmitter in accordance with the invention receives data to be transmitted over a communication link, such as a cable-based or wireless link, as examples. As an example, referring also to FIG. 11, the transmitter 10 may be used as part of a receiver 204/transmitter 10 pair 209 (two shown in FIG. 11, as an example) in a wireless communication system 200, such as a wireless local area network (LAN), for example.

As part of the wireless communication system 200, the transmitter 10 is assigned a subset of OFDM subcarriers for use in transmitting the data over a wireless link 203 to other wireless devices 205. In this manner, the assigned subset of OFDM subcarriers may be used to communicate data associated with a particular user, terminal or electrical device 210 that is coupled to the pair 209 for purposes of communicating over the wireless link 203.

Referring to FIG. 1, during its course of operation, an encoder 12 of the transmitter 10 receives data (via communication lines 11) to be transmitted over the wireless link 203 (FIG. 11), and this data is updated at a predefined sampling rate. The encoder 12 may, for example, introduce an error correcting scheme into the data. The encoder 12 may also perform other operations on the received data, such as a mapping operation, for example. More specifically, the encoder 12 may map the data received by the encoder 12 into a complex value space using quadrature amplitude modulation (QAM). Other and different operations by the encoder 12 are possible.

The encoder 12 provides the encoded data (via communication lines 13) to an Inverse Discrete Fourier Transform (IDFT) engine 14 of the transmitter 10. The IDFT engine 14 includes a processor 31 that executes instructions 33 that, in turn, are stored in a memory 35 of the IDFT engine 14. The encoded data may be viewed as being divided into segments, with each segment representing a coefficient that is associated with one of the assigned subcarriers.

As described below, the IDFT engine 14 modulates these coefficients with the assigned subcarriers to produce a time-varying digital signal. This digital signal, in turn, is communicated (via communication lines 19) to a digital-to-analog converter (DAC) 20 that converts the digital signal into an analog signal. Analog transmission circuitry 23 subsequently modulates this analog signal with at least one radio frequency (RF) carrier signal and transmits the resultant RF signal by driving an antenna 44 in response to the RF signal.

The digital signal that is produced by the IDFT engine 14 forms the information for OFDM symbols that are indicated by the signal that is transmitted by the antenna 44. In this manner, each basic OFDM symbol is formed from an N point IDFT and has a duration that is equal to a periodic rate at which the OFDM symbols are generated. When viewed in the frequency domain, each basic OFDM symbol includes sinc functions that are located at the frequencies of the OFDM subcarriers.

Because the transmitted OFDM symbols may travel along different paths, interference may occur between symbols that are transmitted at different times. This interference, in turn, may degrade the orthogonality of the OFDM modulation and as a result, may prevent full recovery of the transmitted data. To prevent this interference, the IDFT engine 14 extends the length of the basic OFDM symbol by a guard interval, an extension that extends the current OFDM symbol's transmission beyond the time when a reflected previously transmitted OFDM symbol would interfere. The generation of the guard interval is discussed below.

The IDFT engine 14 differs from its inverse Fast Fourier Transform (IFFT) counterpart that is found in a conventional OFDMA transmitter. In this manner, a conventional OFDM transmitter uses the IFFT to calculate the IDFT, as for certain conditions the IFFT uses symmetry to reduce the number of required mathematical operations to compute the IDFT. The IFFT requires, however, an IFFT input data vector that contains coefficients for all of the OFDM subcarriers, regardless if fewer than all of the subcarriers are assigned for purposes of modulation by the transmitter 10. The traditional OFDM transmitter accommodates this scenario by using zero values in the IFFT input data vector for the coefficients that are associated with unassigned subcarriers. However, this conventional technique requires that mathematical operations (multiplication and accumulation operations, for example) still have to be performed in connection with these non-assigned subcarriers, resulting in numerous zero result computations and inefficient modulation.

In contrast to a conventional OFDMA transmitter, the transmitter 10 uses the IDFT engine 14 that, in its computation of the IDFT, only performs mathematical operations that are associated with assigned subcarriers and does not perform such mathematical operations that are associated with unassigned subcarriers. Thus, the IDFT engine 14 performs continuous OFDM modulation.

Figure 2:
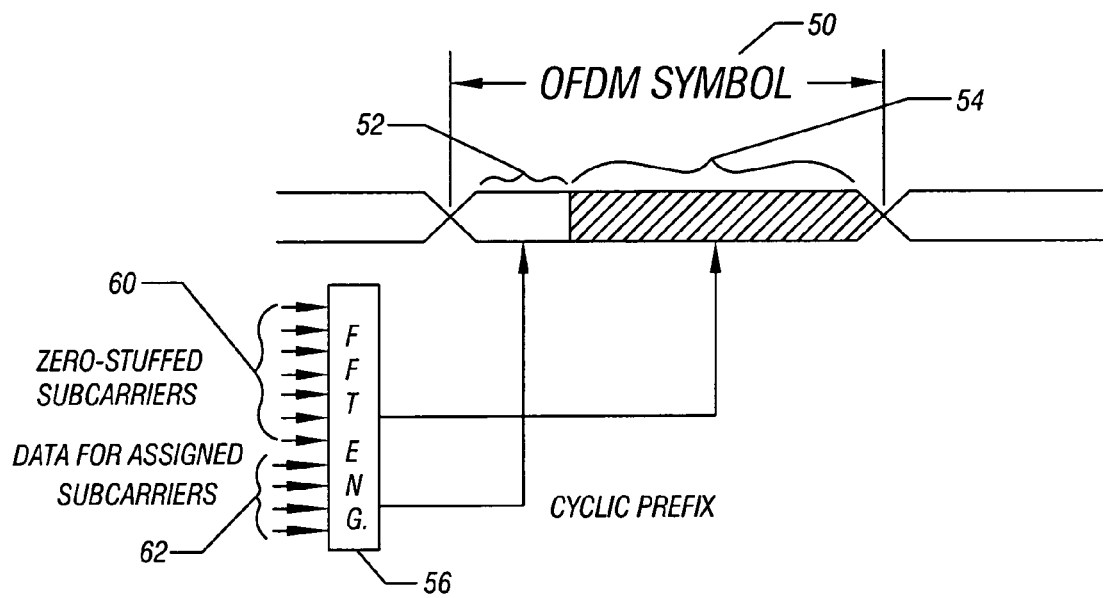
FIG. 2 is an illustration of the generation of an OFDM symbol according to the prior art.

To further illustrate this difference, FIG. 2 depicts the generation of an OFDM symbol 50 using the conventional IFFT technique. As shown, in the prior art, data 62 for assigned subcarriers is passed into an IFFT engine 56 that generates a cyclic prefix 52 as well as the basic OFDM symbol 54. The duration of the basic OFDM symbol 54 defines the period of OFDM signal generation. Zero value data 60 for unassigned subcarriers completes the IFFT input vector for the IFFT engine 56.

Figure 3:
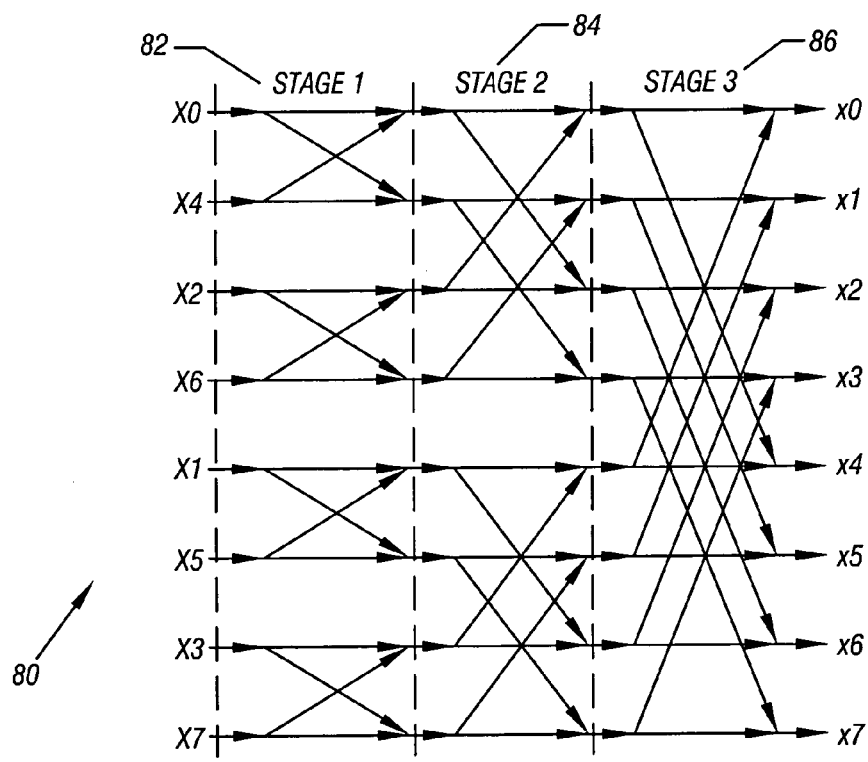
FIG. 3 is a signal flow diagram for computation of an inverse Radix-two IFFT according to the prior art.

The event of the mathematical operations that are performed in conventional OFDMA transmitters because of the processing of zero value coefficients for the non-assigned subcarriers becomes apparent when a signal flow diagram of the IFFT is examined. For example, FIG. 3 depicts a signal flow diagram for the computation of an inverse radix-two IFFT. As shown, for an eight-point IFFT, three stages 82, 84 and 86 are required to compute the IFFT. Additional stages must be added to compute a larger IFFT. As depicted in FIG. 3, each discrete output value from the last stage 86 depends on every input coefficient. Thus, introducing a zero value for one of the input coefficients produces a significant number of mathematical operations that produce a value of zero.

In contrast to the conventional OFDMA transmitter, the transmitter 10 includes the IDFT engine 14 that calculates discrete time values (called $x_n$) pursuant to the following expression:

$$x_n = \sum_{f=0}^{N-1} X_f \cdot e^{-j2\pi fn/N}, \quad \text{Equation 1}$$

where "f" is an integer representing a discrete subcarrier frequency index (and thus, each different value for "f" references a different subcarrier); "N" represents the length of the IDFT and the number of subcarriers; and "$X_f$" represents the coefficients (of the IDFT input vector) to be modulated. The expression "$e^{-2\pi fn/N}$" represents a complex exponential value that is associated with a particular subcarrier, as selected by the "f" index. Thus, the coefficient "$X_1$," for example, is associated with a subcarrier that is referenced by a "1" for the "f" index.

Figure 4:
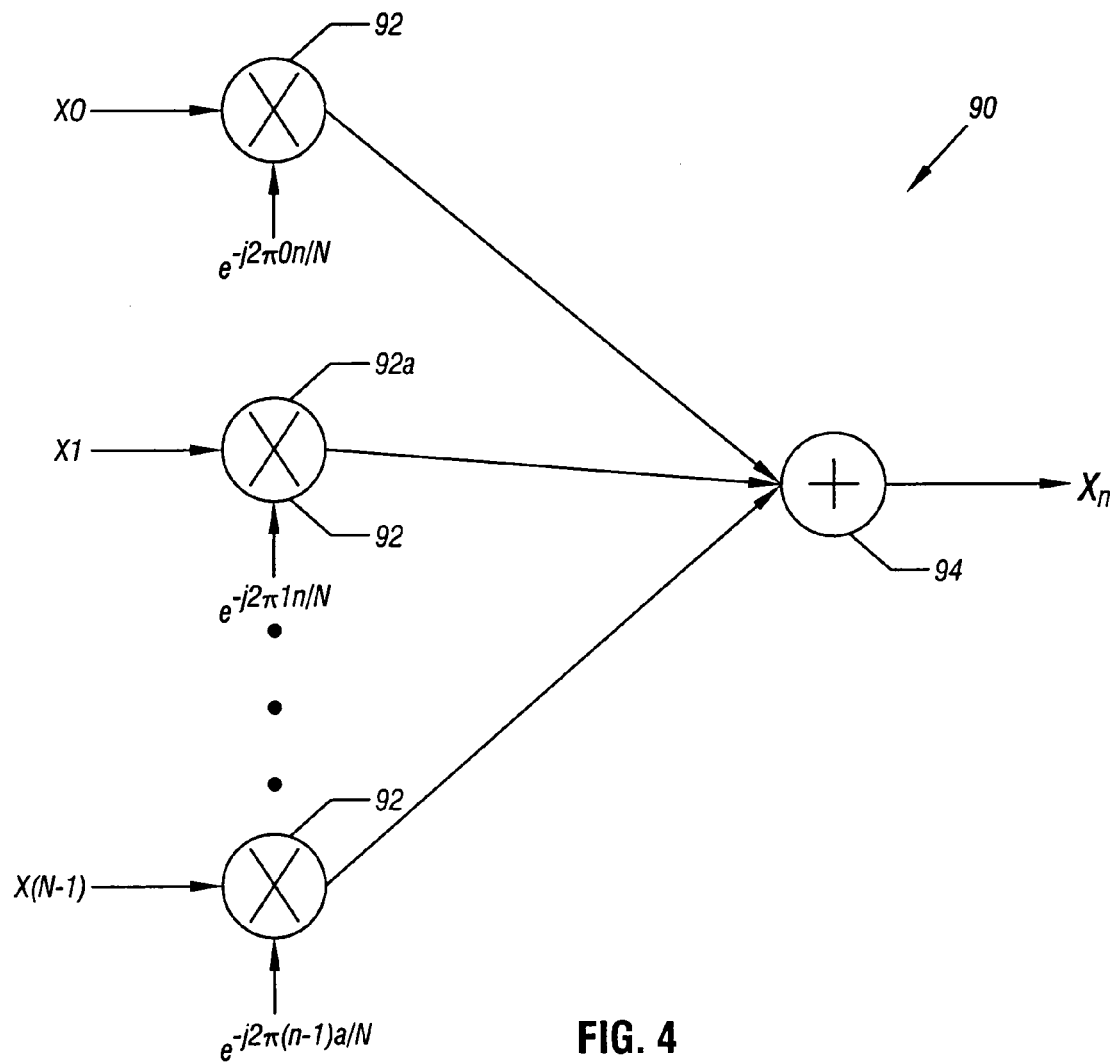
FIG. 4 is a signal flow diagram for the computation of an IDFT according to an embodiment of the invention.

Using Equation 1, the IDFT engine 14 calculates each $x_n$ discrete value by performing mathematical operations (multiply and accumulate operations, for example) only with the $X_f$ coefficients components that are associated with assigned subcarriers. Referring to FIG. 4, in this manner, to compute the IDFT for a particular $x_n$ value, a maximum of N multiply operations 92 are needed, and the results of the operations 92 are accumulated as indicated by reference numeral 94. However, the IDFT engine 14 selectively performs these multiply operations 92, as the operations 92 that are associated with non-assigned subcarriers are skipped.

For example, if the subcarrier that is associated with a "f" index of "1" is not assigned, then the IDFT engine 14 does not perform the multiply operation 92a in the calculation of any of the $x_n$ values. Not only are "n" multiply operations not performed for this example, accumulate operations to accumulate zero value multiplication results are also not performed, thereby resulting in more efficient modulation.

Figure 5:
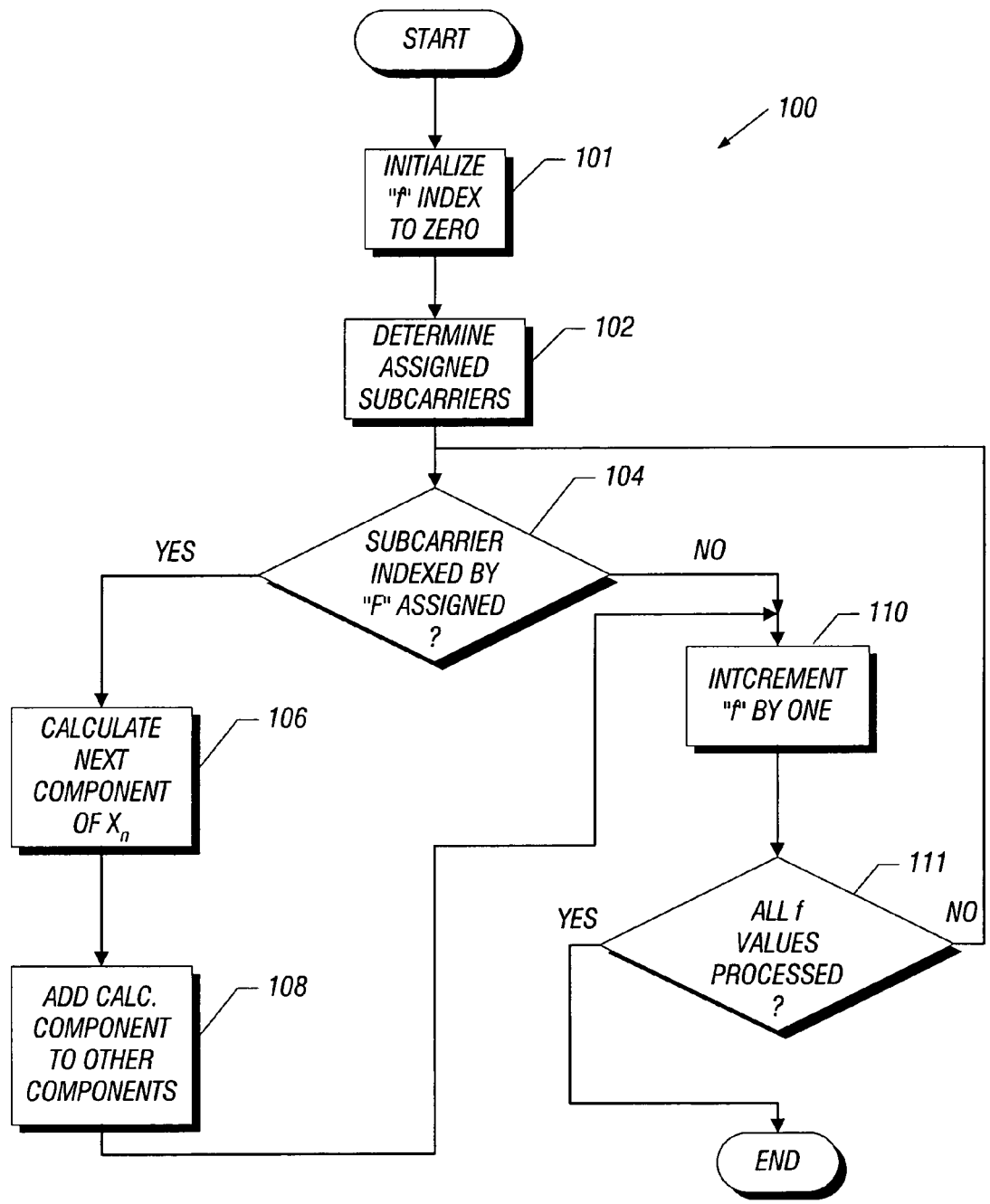
FIG. 5 is a flow diagram depicting a modulation technique according to an embodiment of the invention.

Thus, the IDFT engine 14 may, in some embodiments of the invention, use a technique 100 that is depicted in FIG. 5 for the calculation of each $x_n$ value. To perform the technique 100, as well as other techniques described herein, the processor 31 of the IDFT engine 14 may execute the instructions 33 (see FIG. 1) that are stored in the memory 35. In the technique 100, the IDFT engine 14 initializes (block 101) the "f" index to zero and determines (block 102) the subcarriers that have been assigned to the transmitter 10 for purposes of modulating data that is received by the transmitter 10. In this manner, the transmitter 10 is assigned a subset of the OFDM subcarriers that are available for communication over the wireless link 203 (see FIG. 11), and this subset may be dynamically reassigned. The IDFT engine 14 may receive an indication of the current assigned subset via communication lines 243 (see FIG. 1) that are coupled to the OFDM receiver 204 (part of the OFDM receiver transmitter pair 209) that decodes received information indicating reallocation of the subcarriers.

Subsequently, in the technique 100, the IDFT engine 14 determines (diamond 104) whether the subcarrier that is associated with the current value of the "f" index is assigned. If not, then control transfers to block 110 where the "f" frequency index is incremented by one. If the subcarrier that is associated with the current value of the "f" index is assigned, then the IDFT engine 14 calculates (block 106) the next component of the $x_n$ value by multiplying the complex exponential (see Eq. 1) that is indexed by the "f" index with the appropriate coefficient. Subsequently, the IDFT engine 14 adds (block 108) this component of the $x_n$ value to the other computed components, and control returns to block 110 where the "f" frequency index is incremented by one.

Next, the IDFT engine 14 determines (diamond 111) by examining the value of the "f" frequency index whether all components of the IDFT have been calculated. If not, control returns to diamond 104. Otherwise, the IDFT engine 14 terminates the routine 100, as the value of a particular $x_n$ value has been computed. Thus, the IDFT engine 14 uses the technique 100 to calculate each $x_n$ value.

As an example, a table 112 in FIG. 6 depicts a comparison of the technique 100 used by the IDFT engine 14 with Radix-2 IFFT computations. In particular, the entries in column 113 are different numbers of available OFDM subcarriers (assigned and unassigned); the entries in column 114 are the numbers of computations required by the Radix-2 IFFT computations for the different available OFDM subcarriers; and the entries of column 116 define points where the calculations of the IDFT engine 14 are more efficient than the calculations of the Radix-2 IFFT. In this manner, for the case where the number of assigned subcarriers (column 113) does not exceed the values indicated in column 116, the technique provided by the IDFT engine 14 provides a computational benefit over the conventional IFFT-based modulation.

For example, if the total number of available subcarriers is sixty four (row 3 of table 112), then as long as six or less subcarriers are assigned, the IDFT engine 14 is computationally more efficient than an engine that uses Radix-2 IFFT computations.

Cyclic extensions of OFDM symbols are commonly used to provide guard intervals to combat channel multipath effects. The guard interval for a particular OFDM symbol may be inserted ahead of (called a cyclic prefix) or behind (called a cyclic extension) the basic OFDM symbol. However, regardless of whether a cyclic prefix or extension is added, either scheme may be simplified using the technique used by the IDFT engine 14, as described below.

For example, in some embodiments of the invention, the IDFT engine 14 creates a cyclic extension by generating $x_n$ discrete values for values of "n" that exceed "N." In other words, the symbol generation extends beyond the period that is defined by the rate at which the basic OFDM symbols (without guard intervals) are generated.

For example, FIG. 7 depicts a real component 120 and an imaginary component 122 of one subcarrier and a real component 124 and an imaginary component 126 of another subcarrier. Initially, the phases of these subcarriers are aligned, and when "n" is equal to "N" (two hundred seventy five, for example), as indicated by the vertical line 125, the interval in which the basic OFDM symbol is generated has elapsed. However, as shown, the IDFT engine 14 continues the IDFT beyond that interval to generate the cyclic extension.

Figure 8:
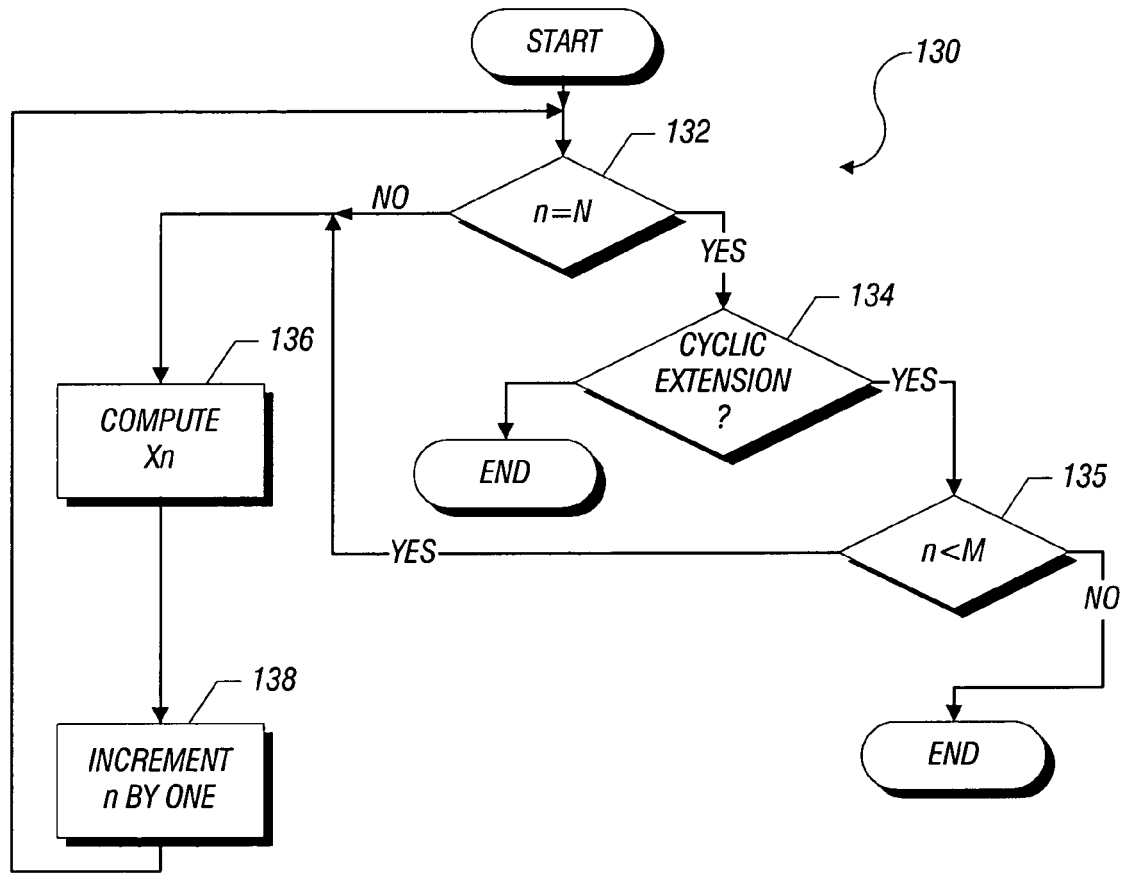
FIG. 8 is a flow diagram depicting a technique to generate an OFDM guard interval according to an embodiment of the invention.

Thus, in some embodiments of the invention, the IDFT engine 14 may use a technique 130 (see FIG. 8) to generate the $x_n$ values and generate the cyclic extension. In this manner, in the technique 130, the IDFT engine 14 determines (diamond 132) whether "n" is equal to "N." If so, the IDFT engine 14 determines (diamond 134) whether a cyclic extension is to be generated, and if so, the IDFT engine 14 determines (diamond 135) whether "n" is equal to "M," an index used to indicate the end of the cyclic extension.

If "n" is less than "N" for the case where no cyclic extension is to be generated or "n" is less than "M" for the case where a cyclic extension is to be generated, then the IDFT engine 14 proceeds to block 136. Otherwise, all of the $x_n$ values for the current OFDM symbol have been generated, and the technique 130 is terminated. In block 136, the IDFT engine 14 computes the $x_n$ value in accordance with the technique 100 described above. Next, the IDFT engine 14 increments (block 138) "n" by one and control returns to diamond 132.

FIG. 9 depicts a scenario in which the IDFT engine 14 appends a cyclic prefix to the basic OFDM symbol. In this manner, FIG. 9 depicts a real component 151 and an imaginary component 152 of one subcarrier and a real component 154 and an imaginary component 156 of another subcarrier. The phases of the subcarriers are aligned beginning with "n" being equal to approximately twenty five (for this example), as indicated by a vertical line 150. Thus, from the time from when "n=0" to when "n=25," the IDFT engine 14 generates a cyclic prefix.

In some embodiments of the invention, the IDFT engine 14 generates the cyclic prefix by rotating the frequencies of the subcarriers. For example, if the cyclic prefix is ten percent of the length of the OFDM generation interval, then the IDFT engine 14 selectively pre-rotates the phase of each subcarrier by $-2\pi \cdot 0.1 \cdot n \cdot f$ radians, where "f" is the frequency index defined above and "n" is an integer.

Figure 10:
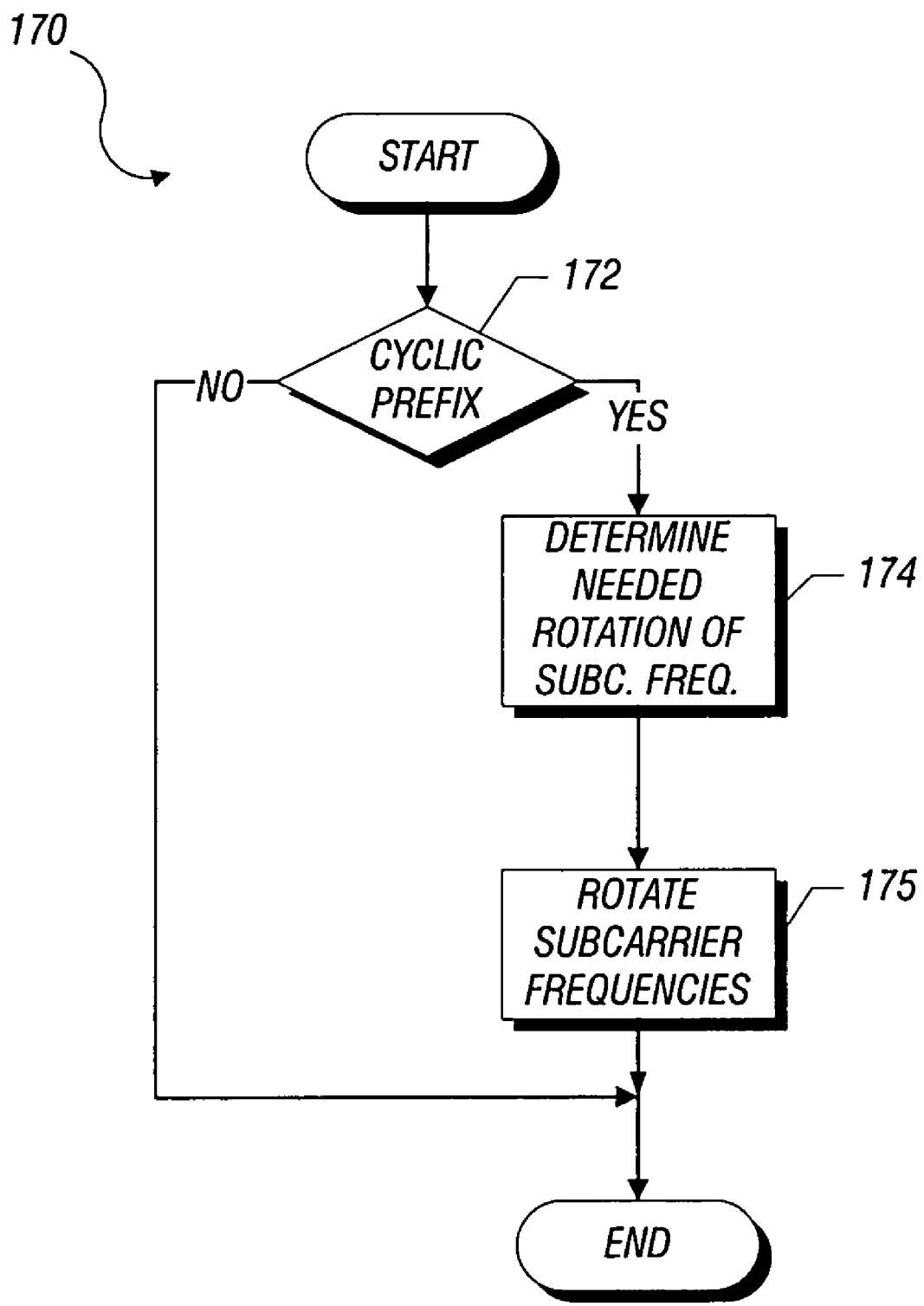
FIG. 10 is a flow diagram depicting a technique to generate a cyclic prefix according to an embodiment of the invention.

Thus, to generate the cyclic prefix, in some embodiments of the invention, the IDFT engine 14 performs a technique 170 that is depicted in FIG. 10. In the technique 170, the IDFT engine 14 determines (diamond 172) whether a cyclic prefix is to be generated. If so, then the IDFT engine 14 determines (diamond 174) the needed rotation of the subcarrier frequencies and then subsequently rotates (block 175) the subcarrier frequencies by the determined amount.

In some embodiments of the invention, the IDFT engine 14 may also perform symbol shaping to reduce sidelobes in the frequency domain. Conventional transmitters may perform such symbol shaping by applying a weighting function (a Raised-Cosine function) in the time domain. However, instead of applying a weighting function in the time domain, the IDFT engine 14 may, in some embodiments of the invention, apply the weighting function in the frequency domain due to the commutativity of the multiplication operations used by the IDFT engine 14. In this manner, as described above, for each $x_n$ value, the IDFT described above multiplies a coefficient that is associated with a particular subcarrier frequency with a complex exponential function that is associated with the subcarrier frequency. Thus, to apply a weighting function, each coefficient may be scaled according to the weighting function to apply the weighting function in the frequency domain.

Alternatively, the weighting function may be applied in the time domain before the IDFT, thereby providing another advantage to the technique that is described herein.

Other embodiments are within the scope of the following claims. For example, although an IDFT is described for purposes of modulation, a DFT instead of the IDFT may be used for modulation using the zero data skipping technique that is described above. In this manner, for these embodiments, the receiver that receives the OFDM symbols uses an IDFT engine for purposes of demodulation. Thus, the term "discrete frequency transformation," as used in the context of this application, may mean either a discrete frequency transformation or an inverse discrete frequency transformation.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A method comprising:
   basing a discrete frequency transformation on the number of subcarriers in a predetermined set of subcarriers, one or more subcarriers of the set assigned to modulate data and the remaining subcarriers of the set not assigned to modulate the data;
   performing the discrete frequency transformation on the data to modulate the data;
   excluding from the transformation mathematical operations associated with the subcarriers not assigned to modulate the data; and
   selectively pre-rotating phases of said one of more subcarriers to generate a cycle prefix.

2. The method of claim 1, wherein the excluding comprises:
   excluding all of the subcarriers not assigned to modulate the data.

3. The method of claim 1, wherein the performing the discrete frequency transformation comprises:
   performing orthogonal frequency division multiplexing modulation on the data.

4. The method of claim 1, wherein the performing comprises:
   applying a weighting function during the discrete frequency transformation to perform symbol shaping.

5. The method of claim 1, wherein said one or more subcarriers are assigned to at least one of a user, an electrical device and a terminal.

6. The method of claim 1, further comprising:
   using the modulated data to form an orthogonal frequency division multiplexing symbol.

7. The method of claim 1, further comprising:
   using the transformation to generate symbols at a rate defined by a symbol generation interval;
   basing the discrete frequency transformation on the symbol generation interval; and
   using the discrete frequency transformation to generate discrete modulated values for an interval that exceeds the symbol generation interval to generate a cyclic extension.

8. The method of claim 7, further comprising:
   transmitting each of the symbols during one of the intervals that exceeds the symbol generation interval.

9. The method of claim 1, wherein the mathematical operations comprise at least one of an accumulate operation and a multiplication operation.

10. A system comprising:
    a device to generate data to be modulated; and
    a transmitter to:
    base a discrete frequency transformation on the number of subcarriers in a predetermined set of subcarriers, one or more subcarriers of the set of subcarriers assigned to modulate data and the remaining subcarriers of the set not assigned to modulate the data;
    perform the discrete frequency transformation on the data to modulate the data;
    exclude from the transformation mathematical operations associated with the subcarriers not assigned to modulate the data; and
    selectively pre-rotate phases of said one or more subcarriers to generate a cyclic prefix.

11. The system of claim 10, wherein the transmitter excludes all of the subcarriers not assigned to modulate the data.

12. The system of claim 10, wherein the transmitter performs orthogonal frequency division multiplexing modulation on the data.

13. The system of claim 10, wherein the transmitter determines components of the discrete frequency transformation independently from each other.

14. The system of claim 10, wherein said one or more subcarriers are assigned to one of a user, an electrical device and a terminal.

15. The system of claim 10, wherein the transmitter uses the modulated data to form an orthogonal frequency division multiplexing symbol.

16. The system of claim 10, wherein the transmitter:
    uses the transformation to generate symbols at a rate defined by a symbol generation interval;
    bases the discrete frequency transformation on the symbol generation interval; and
    uses the discrete frequency transformation to generate discrete modulated values for an interval that exceeds the symbol generation interval to generate a cyclic extension.

17. The system of claim 16, wherein the transmitter transmits each of the symbols during one of the intervals that exceeds the symbol generation interval.

18. The system of claim 10, wherein the mathematical operations comprise at least one of an accumulate operation and a multiplication operation.

19. An article comprising a storage medium readable by a processor-based system, the storage medium storing instructions to cause a processor to:
    base a discrete frequency transformation on the number of subcarriers in a predetermined set of subcarriers, one or more subcarriers of the set assigned to modulate data and the remaining subcarriers not assigned to modulate the data;
    perform the discrete frequency transformation on the data to modulate the data;
    exclude from the transformation mathematical operations associated with the subcarriers not assigned to modulate the data; and
    selectively pre-rotate phases of said one or more subcarriers to generate a cyclic prefix.

20. The article of claim 19, the storage medium storing instructions to cause the processor to exclude from the transformation all mathematical operations associated with the subcarriers not assigned to modulate the data.

21. The article of claim 19, the storage medium storing instructions to cause the processor to perform orthogonal frequency division multiplexing modulation on the data.

22. The article of claim 19, the storage medium storing instructions to cause the processor to determine components of the discrete frequency transformation independently from each other.

23. The article of claim 19, wherein said one or more subcarriers are assigned to one of a user, an electrical device and a terminal.

24. The article of claim 19, the storage medium storing instructions to cause the processor to use the modulated data to form an orthogonal frequency division multiplexing symbol.

25. The article of claim 19, the storage medium storing instructions to cause the processor to:
    use the transformation to generate symbols at a rate defined by a symbol generation interval;

base the discrete frequency transformation on the symbol generation interval; and use the discrete frequency transformation to generate discrete modulated values for an interval that exceeds the symbol generation interval to generate a cyclic extension.

26. The article of claim 25, the storage medium storing instructions to cause the processor to:

transmit each of the symbols during one of the intervals that exceeds the symbol generation interval.

27. The article of claim 19, wherein the mathematical operations comprise at least one of an accumulate operation and a multiplication operation.

* * * * *